(12) United States Patent
Hansson

(10) Patent No.: US 6,769,843 B2
(45) Date of Patent: Aug. 3, 2004

(54) TOOL HOLDER HAVING INSERT SEAT WITH FLEXIBLE SIDE SURFACE

(75) Inventor: Per Hansson, Gävle (SE)

(73) Assignee: Sandvik AB, Sandviken (SE)

( * ) Notice: Subject to any disclaimer, the term of this patent is extended or adjusted under 35 U.S.C. 154(b) by 44 days.

(21) Appl. No.: 10/058,334

(22) Filed: Jan. 30, 2002

(65) Prior Publication Data

US 2002/0109061 A1 Aug. 15, 2002

(30) Foreign Application Priority Data

Jan. 30, 2001 (SE) .............................................. 0100252

(51) Int. Cl.[7] .......................... B23P 15/28; B26D 1/00
(52) U.S. Cl. ...................................... 407/91; 407/104
(58) Field of Search ............................ 407/85, 86, 87, 407/91, 103, 104

(56) References Cited

U.S. PATENT DOCUMENTS

| | | | |
|---|---|---|---|
| 3,623,201 A | | 11/1971 | Gustafson |
| 4,035,890 A | | 7/1977 | Eriksson et al. |
| 4,283,163 A | * | 8/1981 | Grafe et al. ................ 407/104 |
| 4,533,283 A | * | 8/1985 | Satran et al. ................ 407/111 |
| 4,714,384 A | * | 12/1987 | Lagerberg ................... 407/103 |
| 6,126,366 A | * | 10/2000 | Lundblad .................... 407/102 |
| 6,244,789 B1 | * | 6/2001 | Tsuda ......................... 407/107 |
| 6,270,294 B1 | * | 8/2001 | Sjoo et al. .................. 407/101 |
| 6,481,936 B1 | * | 11/2002 | Hecht .......................... 407/111 |
| 2002/0131829 A1 | * | 9/2002 | Persson et al. ............... 407/77 |

FOREIGN PATENT DOCUMENTS

| | | |
|---|---|---|
| DE | 25 44 877 | 4/1976 |
| DE | 37 14 055 | 11/1987 |
| DE | 3714055 A1 * | 11/1987 |

* cited by examiner

Primary Examiner—A. L. Wellington
Assistant Examiner—Brian D. Walsh
(74) Attorney, Agent, or Firm—Burns, Doane, Swecker & Mathis, L.L.P.

(57) ABSTRACT

A tool holder for holding a cutting insert includes a head on which an insert-support surface is disposed. A plate is mounted on the head by a serrated connection, the head including fingers that form side surfaces disposed on opposing sides of the support surface. Each of the side surfaces includes a recess, wherein each side surface defines spaced apart contact areas. A slot extends through one of the fingers in spaced relationship to the side surface formed by that finger to render that side surface flexible. A passage interconnects an intermediate portion of that flexible side surface and an intermediate portion of the slot.

11 Claims, 6 Drawing Sheets

TOOL HOLDER HAVING INSERT SEAT WITH FLEXIBLE SIDE SURFACE

This application claims priority under 35 U.S.C. §§119 and/or 365 to Patent Application Serial No. 0100252-6 filed in Sweden on Jan. 30, 2001, the entire content of which is hereby incorporated by reference.

TECHNICAL FIELD OF THE INVENTION

The present invention relates to a tool holder for cutting inserts for chip removing machining, the tool holder comprising a head, as well as a seat having side surfaces which engage side edges of the clamped-in cutting insert. One of the side surfaces of the seat is flexible.

PRIOR ART

Figures 10, 11:
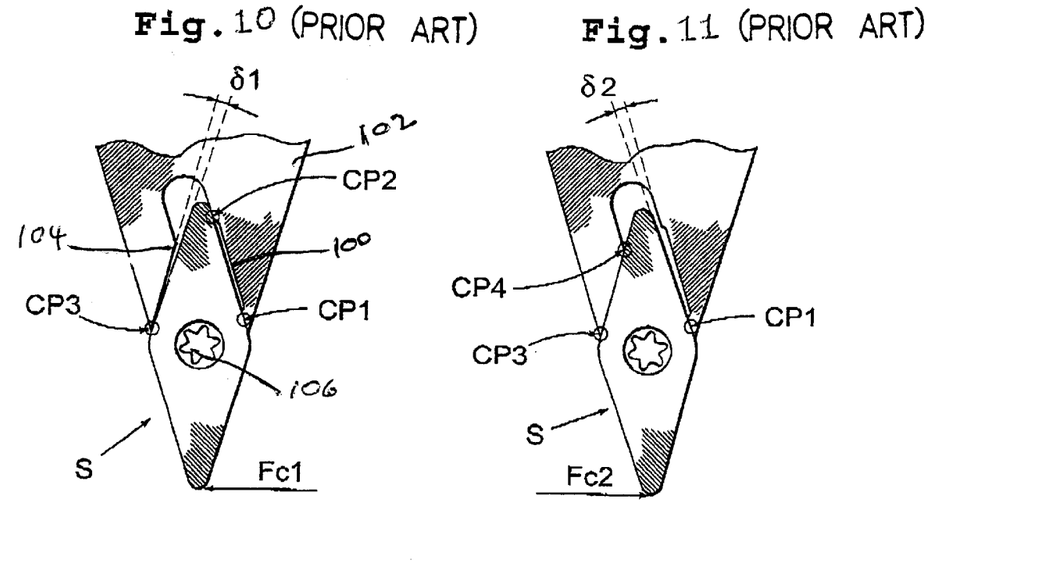
FIG. 10 shows schematically a planar view of the prior art when the cutting insert is exposed to a force, during the clamping of an insert in a tool holder.
FIG. 11 shows schematically a planar view of the prior art illustrated in FIG. 10, however the cutting insert is exposed to a force directed in the opposite direction.
Figure 12:
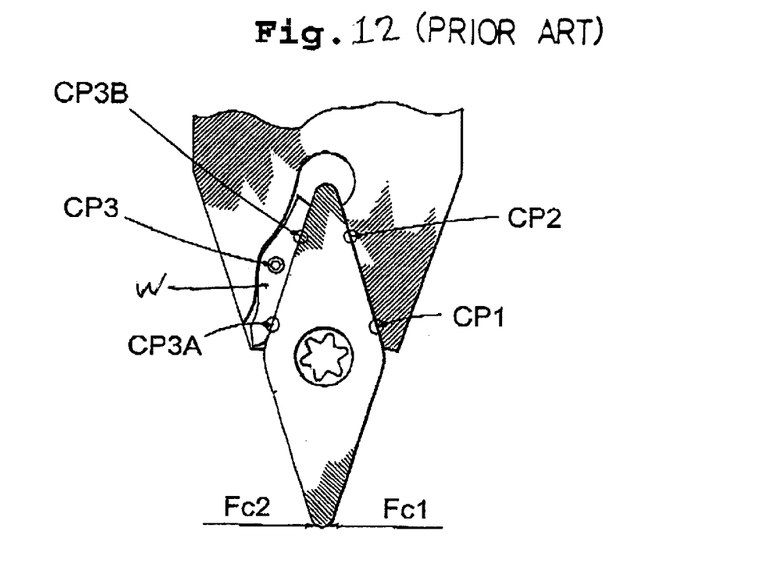
FIG. 12 shows schematically a planar view of the principles for a further developed prior art at clamping of a cutting insert in a tool holder.

In a leaflet from ISCAR, entitled "ISCAR's New Clamping System for Profiling Tools" conventional prior art is shown, which is illustrated herein in FIGS. 10 and 11, as well as a further development of prior art, which is illustrated in FIG. 12 herein.

As is seen in FIGS. 10 and 11, in the conventional prior art there is disclosed a three-point abutment. In case the cutting insert S is exposed to a force Fc1 acting from the right, see FIG. 10, the cutting insert S will abut at two points CP1 and CP2 against the stiffer side surface 100 of a holder 102 and at one point CP3 against a more resilient side surface 104. This is illustrated in FIG. 10 by an angle δ1 formed between the cutting insert S and the more resilient side surface.

If the force Fc2 acting on the cutting insert S comes from the left, see FIG. 11, the cutting insert S will abut against the stiffer side surface at one point CP1 and at two points CP3 and CP4 against the more resilient side surface. This is illustrated in FIG. 11 by an angle δ2 formed between the cutting insert S and the stiffer side surface.

Clamping of the cutting insert S is normally effected with a so-called rocking pin 106, possibly in combination with a top clamp. This has turned out to be insufficient in a number of applications, i.e., the position of the cutting insert is not anchored in the holder to a sufficiently high degree of accuracy. This is particularly valid for this elongated type of cutting insert where large movements of the insert occurs if the insert is exposed to varying loads from differing directions, which is the case in, for instance, copy turning.

As can be seen in the prior art illustrated in FIG. 12, the insert seat is provided with a self-adjusting wedge W which abuts against a side surface of the cutting insert, the wedge being movable and self-adjusting to the cutting insert so that a four-point abutment CP1, CP2, CP3, CP4 is obtained. Since the self-adjusting wedge is movable, the fixation of the cutting insert in the insert seat will also in this case be inadequate for certain applications.

A turning tool having a replaceable indexable insert is previously known from DE 37 14 055. In certain of the embodiments, see FIGS. 4, 4a and 5, of a timing tool according to DE 37 14 055, a flat wedge abutting against the indexable insert is provided with opposite slots, the open ends of which break through the longitudinal side edges of the flat wedge. The flat wedge abuts against the indexable insert with two contact points. A disadvantage of this known turning tool is that if the side surface of the insert seat that is integrated with the proper turning tool is damaged or becomes worn out, the entire turning tool has to be replaced, which is disadvantageous from the point of view of cost. As for the forces being transferred from the indexable insert to the two contact points of the flat wedge, said forces will pass past the open ends of the slots, which means that the slots are compressed in the area of the open ends thereof. Thus, the flat wedge will give way and thereby not give any active support to the cutting insert when the same tries to turn because of the external forces affecting the insert tip.

AIMS AND FEATURES OF THE INVENTION

A primary aim of the present invention is to provide a tool holder of the above-mentioned kind, where an exceptionally accurate clamping of the cutting insert in the insert seat is obtained, this notwithstanding that the cutting insert is exposed to varying sizes and/or directions of loading during, for instance, copy turning. The consequence of this is increased dimensional precision through the use of the tool holder.

Yet another aim of the present invention is that the cutting insert is to be anchored in the insert seat by means of a so-called four-point abutment.

Another aim of the present invention is that the insert seat should align automatically to the cutting insert when the same is anchored in the appurtenant insert seat thereof.

SUMMARY OF THE INVENTION

The present invention relates to a tool holder for holding a cutting insert for chip removing machining. The holder comprises a head and a support surface disposed on the head and adapted to support a cutting insert. A plate-shaped member is removably secured on the head and includes two fingers forming respective side surfaces disposed on respective sides of the support surface. The side surfaces face one another and extend generally perpendicularly to the support surface. Each of the side surfaces includes a recess disposed intermediate opposite ends thereof, wherein each side surface defines spaced apart contact areas. One of the fingers includes a through-slot spaced from the respective side surface and extending generally therealong to render that support surface flexible.

Preferably, a passage extends between an intermediate portion of the flexible side surface and an intermediate portion of the through-slot.

Preferably, the plate-shaped member includes a first serrated surface seated on a second serrated surface of the head to define a serrated connection between the plate-shaped member and the head. The serrated connection is omitted at one of the fingers.

BRIEF DESCRIPTION OF THE DRAWINGS

Below a preferred embodiment of the tool holder according to the present invention will be described, reference being made to the accompanying drawings.

DETAILED DESCRIPTION OF A PREFERRED EMBODIMENTS OF THE INVENTION

Figure 1:
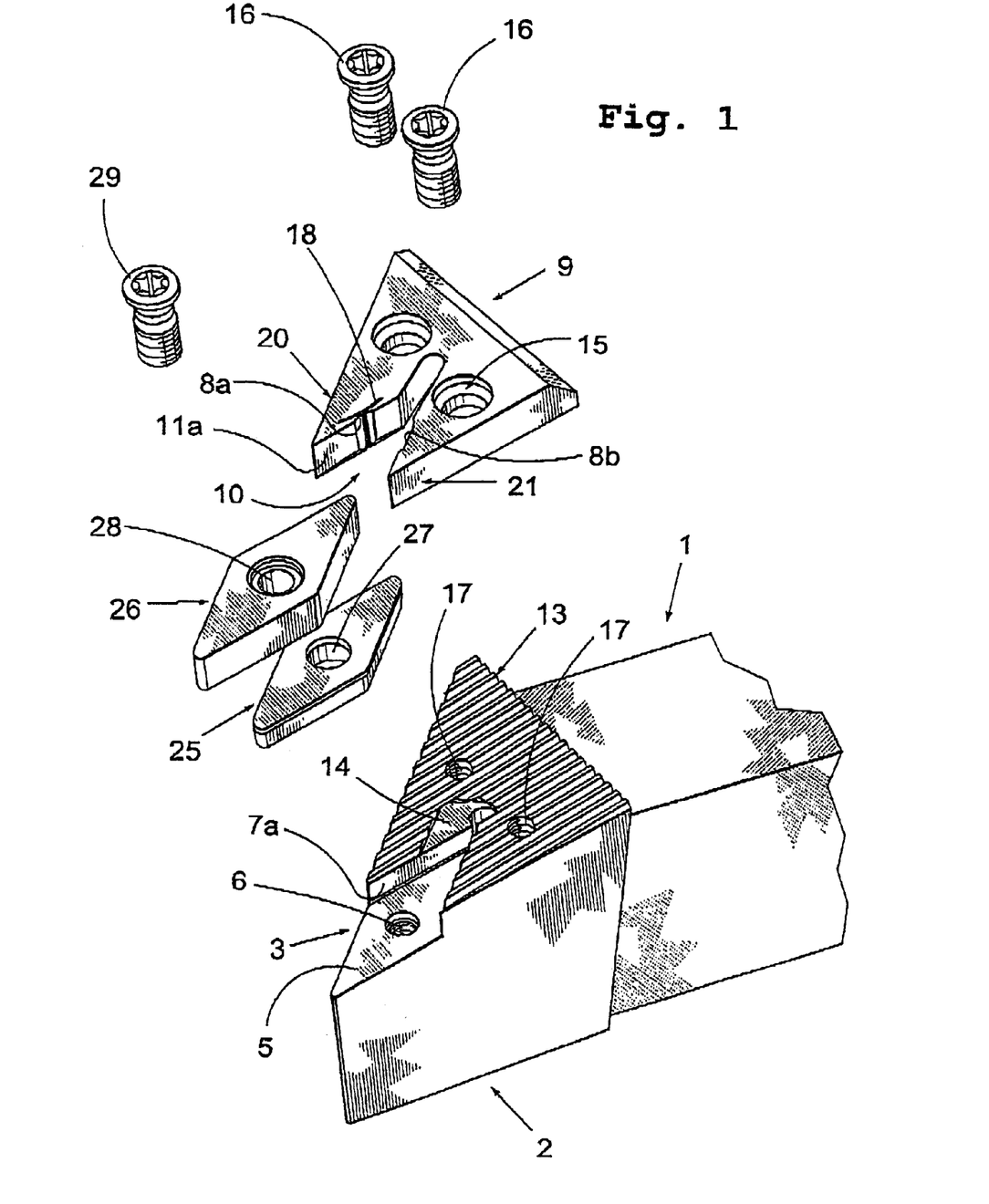
FIG. 1 shows an exploded view in perspective of a tool holder according to the present invention as well as a cutting insert with shim plate received in an insert seat of the tool holder.

The tool holder according to the present invention illustrated in FIG. 1 comprises a shaft 1, which at one end thereof has a head or base body 2, at which there is arranged an insert seat 3 defining a fixed location position. The head 2 comprises a bottom surface 5, an internally threaded center hole (first hole) 6 situated in the bottom surface 5, a first side surface 7a and a second side surface 7b. The tool holder according to the invention also comprises a detachable insert seat plate 9, which has a recess 10, defined by a third side surface 11a and a fourth side surface 11b, see FIG. 4. Each of the side surfaces 11a and 11b features a recess 8a, 8b disposed intermediate the inner end and free outer end thereof to divide each of the side surfaces 11a and 11b into two contact areas, see also the description associated with FIGS. 5–7. The side surfaces 11a and 11b define between themselves an acute angle. In addition to the recess 10, the insert seat plate 9 has in planar view a shape which corresponds to the shape in planar view of the part of the head 2 which the insert seat plate 9 is intended to be mounted on.

Figure 2:
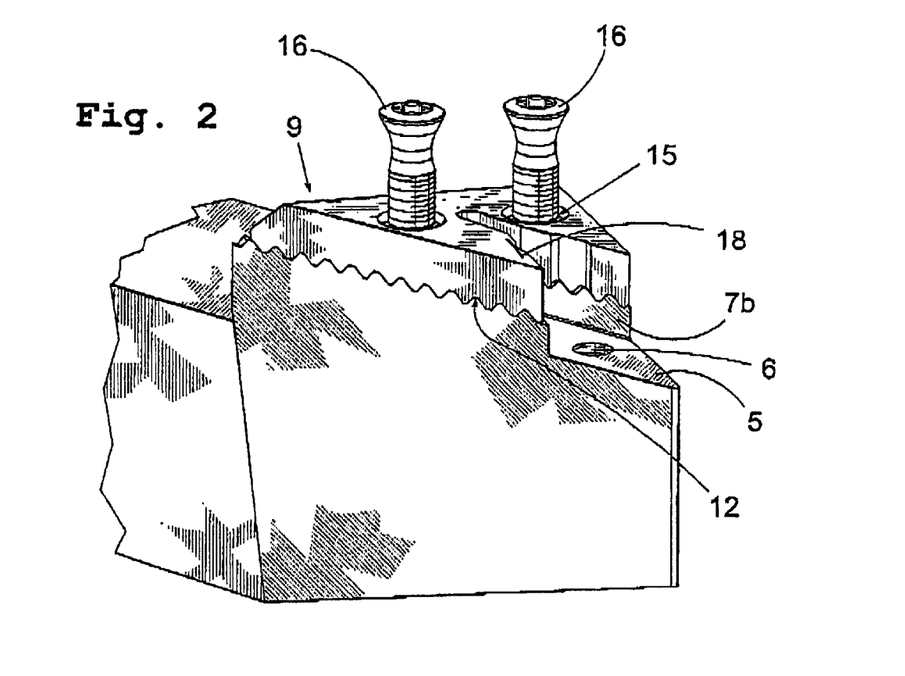
FIG. 2 shows a perspective view from a direction different than FIG. 1, of the tool holder according to the present invention, including an insert seat plate of the tool holder.

As is seen in FIG. 2, the insert seat plate 9 is provided with first serrations 12 on the side thereof facing the head 2, see FIG. 2. The first serrations 12, in the mounted position of the insert seat plate 9 on the head 2, generally extend in the longitudinal direction of the shaft 1.

As is seen in FIG. 1, the major part of the portion of the head 2 that is intended to receive the insert seat plate 9 is provided with second serrations 13, which generally also extend in the longitudinal direction of the shaft 1. A smaller portion 14 of the head 2, situated adjacent to the first side surface 7a, is not provided with serrations, i.e., there exists no serrated connection, the reason for this being explained below. As is seen in FIG. 2, the first serrations 12 and the second serrations 13 mesh with each other when the insert seat plate 9 is mounted on the head 2.

Figure 3:
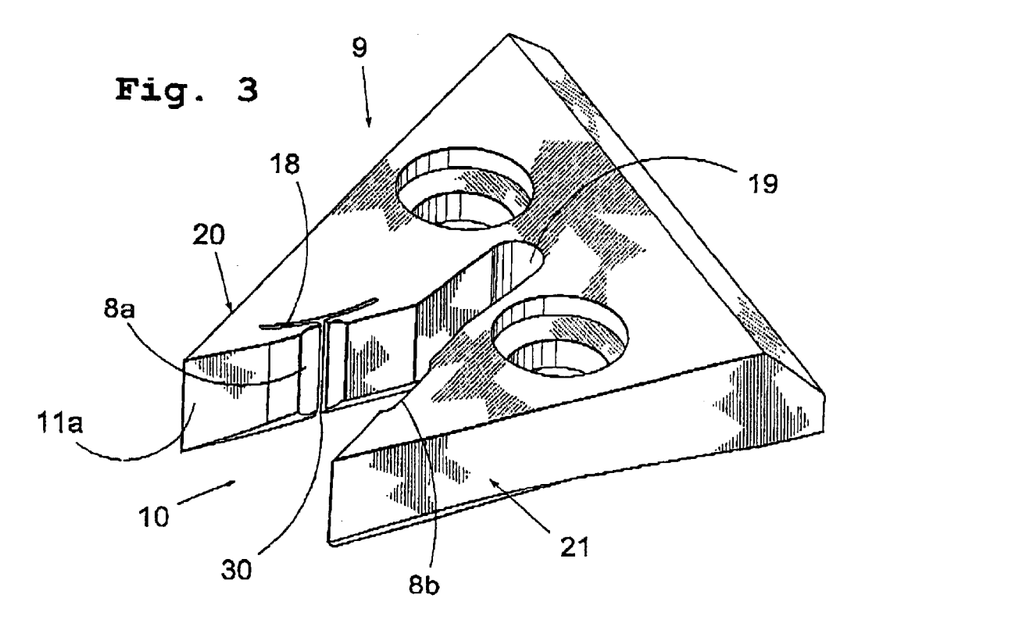
FIG. 3 shows a perspective view of the insert seat plate according to FIG. 2.

As is seen in FIGS. 1–3, the insert seat plate 9 is provided with a number of through-holes (second holes) 15, in which first screws 16 are intended to be received in order to anchor the insert seat plate 9 to the head 2. For this purpose, the head 2 is provided with a number of internally threaded third holes 17, which in the mounted position of the insert seat plate 9 on the head 2 are located opposite the second holes 15. In FIG. 2 is shown how the first screws 16 are about to be applied in the second holes 15. When the first screws 16 are finally applied in the third holes 17, the first and second serrations 12 and 13 are in engagement with each other, whereby an exceptionally safe and accurate anchorage of the insert seat plate 9 is achieved on the head 2, i.e., the anchorage has an extraordinary good ability to transmit forces between the insert seat plate 9 and the head 2. In the embodiment illustrated, the insert seat plate 9 has two second holes 15, and the head 2 is correspondingly provided with two third holes 17.

Figure 4:
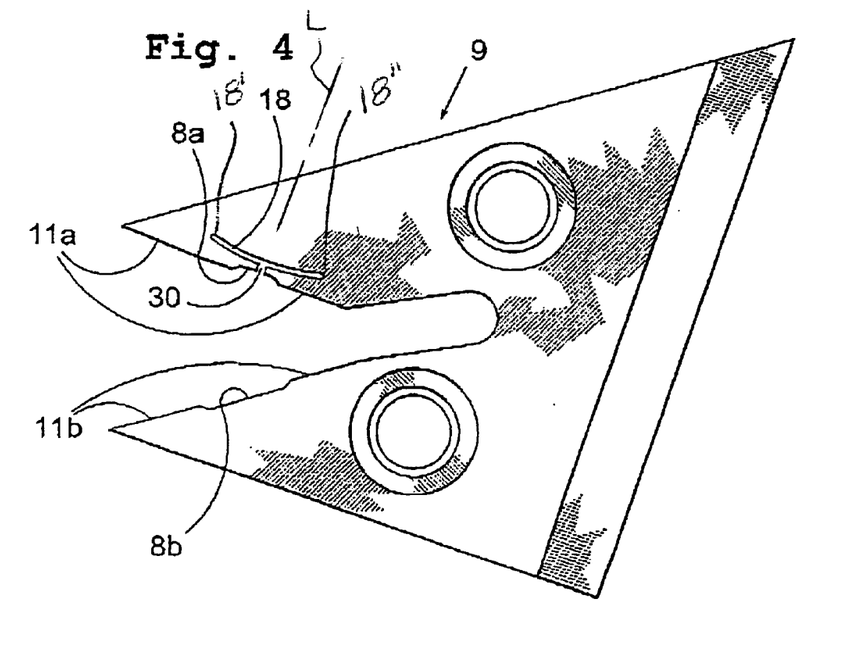
FIG. 4 shows a planar view of the insert seat plate according to FIG. 3.

As is most clearly seen in FIG. 3, the insert seat plate 9 has a slot 18, which has a generally curved shape and is situated adjacent to the third side surface 11a of the insert seat plate 9, which also has a fourth side surface 11b, see FIG. 4. The slot extends completely through the plate 9 and thus constitutes a through-slot. Generally, the slot 18 extends along the third side surface 11a, and the bending (profile) of the slot 18 is such that the closed ends 18', 18" of the slot 18 are farther away from the third side surface 11a than is an intermediate portion of the slot 18. Preferably, the slot 18 has a constant width along the entire length thereof. The slot 18 has a length which is smaller than the length of the flexible side surface 11a. Furthermore, the slot 18 is preferably centered with respect to the flexible side surface 11a, i.e., an intermediate portion of the slot 18 is located opposite an intermediate portion of the flexible side surface 11a.

As is seen in FIGS. 3 and 4, a passage 30 is arranged between those intermediate portions. According to the illustrated embodiment, the passage 30 joins to the slot 18 approximately at the center of the slot 18. Both the slot 18 and the passage 30 extend along the entire height of the insert seat plate 9. The arrangement of the slot 18 with the appurtenant passage 30 increases the flexibility of the third side surface 11a.

The insert seat plate 9 also has a notch 19, which in turn ports into the recess 10 (FIG. 3). The notch 19 extends along the entire height of the insert seat plate 9. A first finger-like portion 20 and a second finger-like portion 21 of the insert seat plate 9 are defined by the recess 10 and the notch 19 which are centrally situated in the insert seat plate 9. The slot 18 is situated in the first finger-like portion 20, the slot 18 thus having an extension along the third side surface 11a of the first finger-like portion 20. The through-slot 18 is intersected at its midpoint by an imaginary line L (see FIGS. 4 and 8) oriented perpendicular to the finger 20 and passing through the recess 8a of the finger 20.

Figure 5:
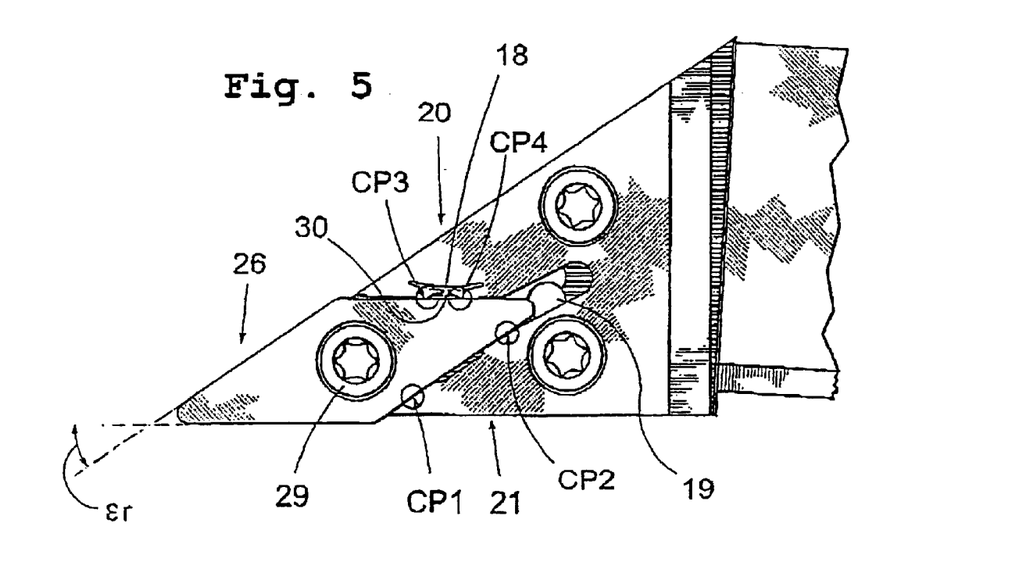
FIG. 5 shows in planar view schematically an initial position when mounting a cutting insert in the insert seat plate according to FIG. 5.
Figure 6:
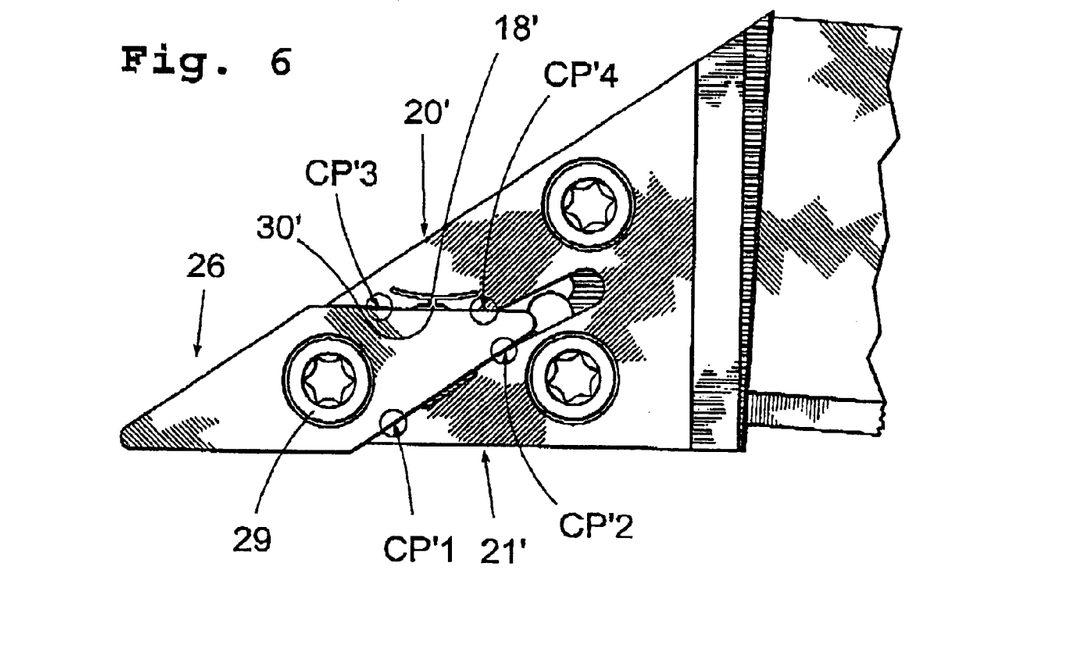
FIG. 6 shows a similar view as FIG. 5 in an intermediate position of the mounting of the cutting insert.

When the insert seat plate 9 is being mounted on the head 2, a shim plate 25 and an indexable insert 26 may be applied in the seat 3, the shim plate 25 being applied first by being brought to abutment against the bottom surface 5. Then, the indexable insert 26 is seated on a support surface, defined in this embodiment by a top surface of the shim plate 25. Accordingly, a second center hole 27 in the shim plate 25 is disposed mainly opposite a second center hole 28 in the indexable insert 26, but the first center 7 hole 27 is preferably somewhat displaced in relation to the second center hole 28, which is explained below. The shim plate 25 and the indexable insert 26 are anchored in the seat 3 by a third screw 29 extending through the second and third center holes 27 and 28 as well as into the center hole 6 in the bottom surface 5. Thereby, the indexable insert 26 is anchored in the recess 10 of the insert seat plate 9 in a satisfactory way, the indexable insert 26 abutting against both the third side surface 11a and the fourth side surface 11b of the insert seat plate 9. Preferably, the cutting insert 26 has a height, which equals the height of the insert seat plate 9. The cutting insert 26 illustrated in the described embodiment is a rhombic cutting insert which is intended for copying lathing. In that connection, it is suitable that the angle $\epsilon_r$ illustrated in FIG. 5 is in the interval $30° < \epsilon_r < 60°$.

The cutting insert 26 illustrated in the described embodiment is a rhombic cutting insert which is intended for copying lathing. In that connection, it is suitable that the angle $\epsilon_r$ illustrated in FIG. 5 is in the interval $30°<\epsilon_r<60°$.

Figure 7:
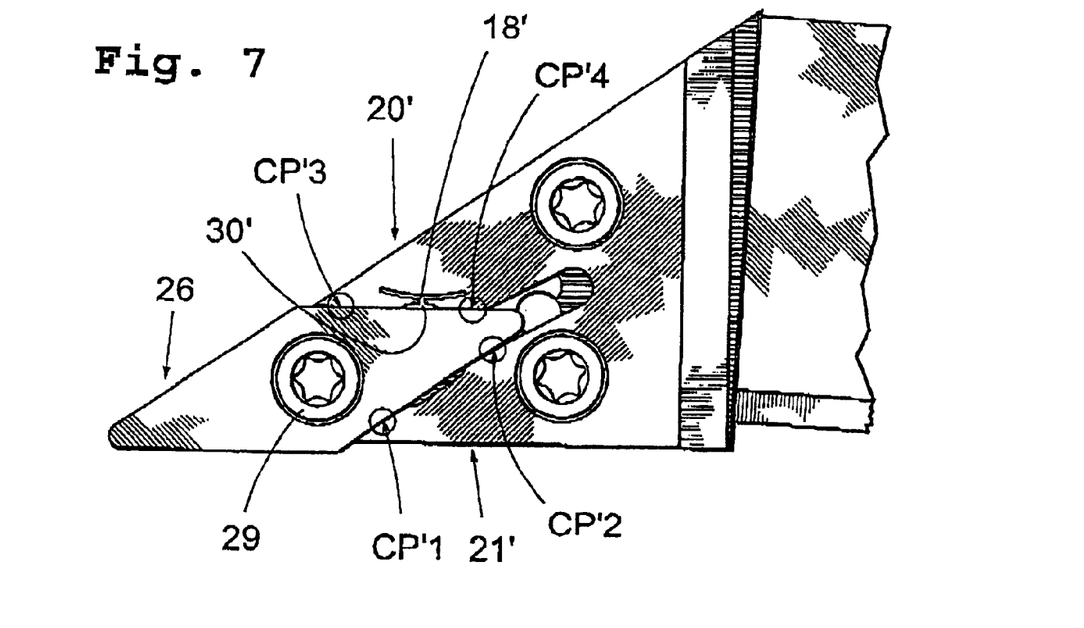
FIG. 7 shows a similar view as FIG. 5 in a final position of the mounting of the cutting insert.

The design of the insert seat plate 9 with the slot 18 and the passage 30 ensures that the third side surface 11a has a certain flexibility. This is illustrated schematically in FIGS. 5–7. Initially, when the cutting insert 26 is first brought to abutment against the third side surface 11a of the first finger-like portion 20 and the fourth side surface 11b of the second finger-like portion 21, the position illustrated in FIG. 5 arises, i.e., the second finger-like portion 21 supports the cutting insert 26 at two contact points CP1 and CP2, which are situated relatively far from each other while the first finger-like portion 20 supports the cutting insert 26 at two contact points CP3 and CP4, which are situated relatively near each other. At additional clamping of the cutting insert 26, upon tightening the screw 29, the contact points CP3 and CP4 will be moved farther from each other, see FIGS. 6 and 7, where FIG. 7 illustrates the position when the cutting insert 26 is finally anchored in the recess 10 of the insert seat plate 9. Of course, the reason for the contact points CP3 and CP4 being further distanced from each other is the flexibility of the side surface 11a entailed by the slot 18 and the passage 30.

In order to guarantee that there is a satisfactory abutment between the cutting insert 26 and the third and fourth side surfaces 11a and 11b, respectively, of the insert seat plate 9, the first hole 6 in the bottom surface 5 is located in such a way that the third hole 28 of the cutting insert 26 is somewhat displaced in relation to said first hole 6 when the cutting insert 26 is applied in the recess 10 of the insert seat plate 9. In doing so, the first hole 6 is situated somewhat closer to the notch 19 than the third hole 28 in the cutting insert 26, so that an inwardly directed prestressing force is generated on the cutting insert 26 when the insert 26, by means of the third screw 29, is anchored in the recess 10 of the insert seat plate 9.

In this connection, it should be observed that a portion 14 of the surface of the head 2 that faces the plate 9 has no serrations 13. The portion 14 is situated adjacent to the third side surface 11a of the insert seat plate 9 when the insert seat plate 9 is mounted on the head 2. The portion 14 is situated under the slot 18, whereby a position adjustment of the side surface 11a may be performed during clamping of the insert since the sections of the serrations 12 which abut against the non-serrated portion 14 can be displaced in relation to said portion 14.

Figure 8:
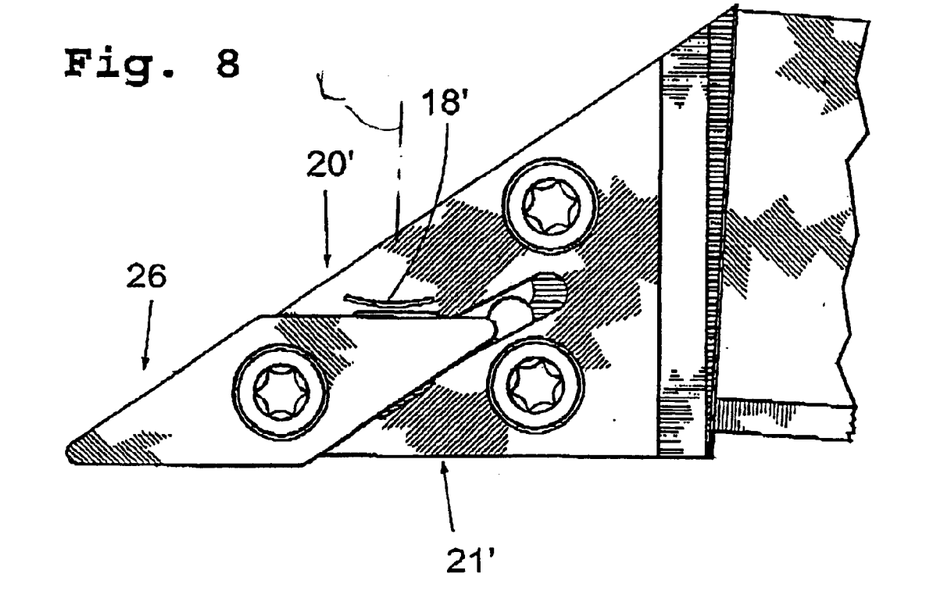
FIG. 8 shows a planar view of a tool holder with a second alternative embodiment of an insert seat plate.

The second alternative embodiment of an insert seat plate 9' illustrated in FIG. 8 differs principally from the insert seat plate 9 in that the slot 18' does not have any passage 30, making the flexibility of the appurtenant side surface 11'a somewhat less.

Figure 9:
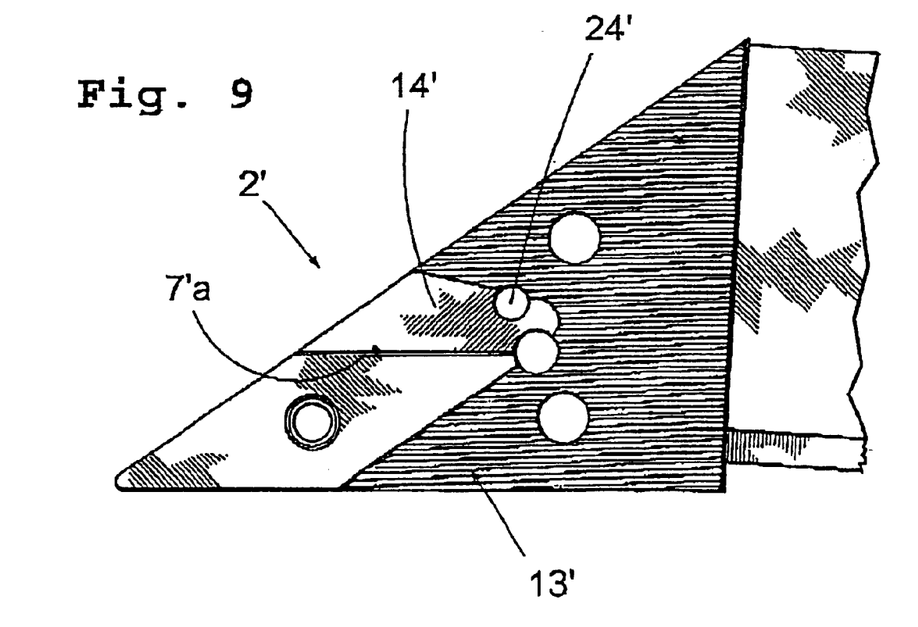
FIG. 9 shows in planar view an alternative embodiment of a head, which is intended to cooperate with the illustrated embodiments of insert seat plates.

In FIG. 9, an alternative design of a head 2' is shown where the non-serrated portion 14' extends along the entire first side surface 7'a, and a hole 24' is formed partially in the non-serrated portion 14' and partially in the adjacent serrated portion.

FEASIBLE MODIFICATIONS OF THE INVENTION

In the above-described embodiment, a small portion 14; 14' of the head 2; 2' is not provided with serrations while the portion abutting against said portion 14; 14' of the insert seat plate 9; 9' is provided with serrations 12. However, within the scope of the present invention, it is feasible that also the portion of the insert seat plate 9; 9' abutting against the small portion 14; 14' lacks serrations, whereby in that case two plane portions abut against each other. Important in this connection is that said portions need not be in engagement with each other but rather can be displaced from each other in connection with the flexible side surface 11a; 11'a being position-adjusted.

Within the scope of the present invention, it is also feasible that the insert seat plate 9; 9' in the area of the first finger-like portion 20 and on the side that is faced to the head 2; 2' has a small portion which is not provided with serrations while the head 2; 2' is provided with serrations on the entire side that is faced to the insert seat plate 9; 9'.

Even if the arrangement of cooperating longitudinal serrations on the head 2; 2' and the insert seat plate 9; 9' is the preferred embodiment for coupling the plate to the head, there are a large a number of alternatives, within the scope of the present invention, in order to bring about the necessary transmission of force between the insert seat plate 9; 9' and the head 2; 2'. For certain types of applications, the serrations may be entirely omitted, i.e., it is sufficient to employ a simple screw joint in order to transmit forces between the insert seat plate 9; 9' and the head 2; 2', i.e., wherein the surfaces of the insert seat plate 9; 9' and the head 2; 2' that abut against each other would be essentially planar.

According to an additional alternative, it is feasible that the serrations are supplemented with pins, which bridge the interface between the insert seat plate 9; 9' and the head 2; 2'. The pins have, in that connection, the purpose of absorbing forces which act in the longitudinal direction of the serrations, whereby the accuracy regarding the mutual position orientation between the insert seat plate 9; 9' and the head 2; 2' is improved.

The serrations may also be formed in such a way that the same are arranged crisscross, i.e., they form a check or waffle pattern. Thereby, the serrations may absorb forces in two directions perpendicular to each other, also in this case the accuracy regarding the mutual positioning between the insert seat plate 9; 9' and the head 2; 2' being improved.

An additional alternative way to achieve the force-transmitted cooperation between the head and the insert seat plate is by means of a key-groove arrangement, which brings about the requisite transmission of forces between the head add the insert seat plate.

All examples above of devices for providing a force-transmitted cooperation between the insert seat plate 9; 9' and the head 2; 2' are given as an exemplifying and not limiting measure.

In the above-described embodiments, the indexable insert 26 is intended to be anchored in the recession 10 of the insert seat plate 9 by means of the third screw 29 that is received in a center hole of the indexable insert 26. However, the principles for the present invention are also applicable to tool holders where the indexable inserts are secured by means of other members, as an exemplifying and not limiting measure, different types of top clamps may be mentioned.

In the above-described embodiments, a shim plate 25 is applied in the seat to form an insert support surface. However, within the scope of the present invention, it is also feasible that the tool holder lacks a shim plate, i.e., the bottom surface of the seat is situated on the same level as the surface of the head 2; 2' that receives the insert seat plate 9; 9', whereby such bottom surface would form the insert support surface.

The tool holder according to the present invention is primarily intended for rhombic, so-called copying inserts.

However, within the scope of the present invention, it is also feasible that the principles for the present invention are applicable to tool holders for triangular and square cutting inserts.

Although the present invention has been described in connection with preferred embodiments thereof, it will be appreciated by those skilled in the art that even further additions, deletions, modifications, and substitutions not specifically described may be made without departing from the spirit and scope of the invention as defined in the appended claims.

What is claimed is:

1. A tool holder for holding a cutting insert for chip removing machining, comprising:
    a head on which is disposed an insert seat including an insert-support surface; and
    a plate-shaped member removably secured on the head and including two fingers forming respective side surfaces disposed on respective sides of the support surface, the side surfaces facing one another and extending generally perpendicularly to the support surface;
        each of the side surfaces including a recess disposed intermediate opposite ends thereof, wherein each side surface defines spaced apart contact areas,
        one of the fingers including a through-slot spaced from the respective side surface and extending generally therealong to render that side surface flexible, the through-slot having first and second opposite ends which are closed, the through-slot being intersected at its substantial midpoint by an imaginary line oriented perpendicular to the one finger and passing through the recess of the one finger.

2. The tool holder according to claim 1, wherein the through-slot includes opposite ends spaced farther from the flexible side surface than is an intermediate portion of the through-slot.

3. The tool holder according to claim 2 further including a passage extending between an intermediate portion of the flexible side surface and an intermediate portion of the through-slot.

4. The tool holder according to claim 1 further including a passage extending between an intermediate portion of the flexible side surface and an intermediate portion of the through-slot.

5. The tool holder according to claim 1 wherein the plate-shaped member includes a first serrated surface seated on a second serrated surface of the head to define a serrated connection between the plate-shaped member and the head.

6. The tool holder according to claim 5 wherein the serrated connection is omitted at the flexible finger.

7. The tool holder according to claim 1 wherein each of the side surfaces includes an inner end and a free outer end, the plate-shaped member further including a notch extending from the inner ends of the side surfaces within the plane of the plate-shaped member.

8. The tool holder according to claim 1 further including a shim mounted on the head and forming the support surface.

9. A tool holder for holding a cutting insert for chip removing machining, comprising:
    a head;
    a support surface disposed on the head and adapted to support a cutting insert;
    a plate-shaped member removably secured on the head and including two fingers forming respective side surfaces disposed on respective sides of the support surface, the side surfaces facing one another and extending generally perpendicularly to the support surface;
        each of the side surfaces including a recess disposed intermediate opposite ends thereof, wherein each side surface defines spaced apart contact areas,
        one of the fingers including a through-slot spaced from the respective side surface and extending generally therealong to render that side surface flexible, the through-slot being intersected at its substantial midpoint by an imaginary line oriented perpendicular to the one finger and passing through the recess of the one finger;
    a passage extending between an intermediate portion of the flexible side surface and an intermediate portion of the through-slot;
    the plate-shaped member including a first serrated surface seated on a second serrated surface of the head to define a serrated connection between the plate-shaped member and the head; the serrated connection being omitted at the flexible finger.

10. A tool holder for holding a cutting insert for chip removing machining, comprising:
    a head on which is disposed an insert seat including an insert-support surface; and
    a plate-shaped member removably secured on the head and including two fingers forming respective side surfaces disposed on respective sides of the support surface, the side surfaces facing one another and extending generally perpendicularly to the support surface;
        each of the side surfaces including a recess disposed intermediate opposite ends thereof, wherein each side surface defines spaced apart contact areas,
        one of the fingers including a through-slot spaced from the respective side surface and extending generally therealong to render that side surface flexible, wherein the through-slot includes opposite ends spaced farther from the flexible support surface than is an intermediate portion of the through-slot.

11. A tool holder for holding a cutting insert for chip removing machining, comprising:
    a head on which is disposed an insert seat including an insert-support surface; and
    a plate-shaped member removably secured on the head and including two fingers forming respective side surfaces disposed on respective sides of the support surface, the side surfaces facing one another and extending generally perpendicularly to the support surface;
        each of the side surfaces including a recess disposed intermediate opposite ends thereof, wherein each side surface defines spaced apart contact areas,
        one of the fingers including a through-slot spaced from the respective side surface and extending generally therealong to render that side surface flexible, and further including a passage extending between an intermediate portion of the flexible side surface and an intermediate portion of the through-slot.

* * * * *